United States Patent
Silvestro (10) Patent No.: US 10,744,443 B2
(45) Date of Patent: Aug. 18, 2020

(54) FUME FILTER BANK WITH PANEL FILTER

(71) Applicant: Lincoln Global, Inc., Santa Fe Springs, CA (US)

(72) Inventor: Nino V. Silvestro, Independence, OH (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 270 days.

(21) Appl. No.: 15/902,070

(22) Filed: Feb. 22, 2018

(65) Prior Publication Data
US 2018/0264388 A1 Sep. 20, 2018

Related U.S. Application Data

(60) Provisional application No. 62/472,914, filed on Mar. 17, 2017.

(51) Int. Cl.
*B01D 46/12* (2006.01)
*B01D 46/00* (2006.01)

(52) U.S. Cl.
CPC ....... *B01D 46/125* (2013.01); *B01D 46/0005* (2013.01); *B01D 46/008* (2013.01); *B01D 46/0086* (2013.01); *B01D 46/002* (2013.01); *B01D 2265/02* (2013.01);
(Continued)

(58) Field of Classification Search
CPC .............. B01D 46/0005; B01D 46/008; B01D 46/125; B01D 2265/025; B01D 2271/022; B01D 46/12; B01D 46/002; B01D 46/0086; B01D 46/521; B01D 46/0068;
(Continued)

(56) References Cited

U.S. PATENT DOCUMENTS 3,383,841 A * 5/1968 Olson ................... B01D 46/06
55/337
3,624,161 A 11/1971 Bub
(Continued)

FOREIGN PATENT DOCUMENTS

DE 40 04 343 A1 8/1991
DE 101 02 100 A1 7/2002
(Continued)

OTHER PUBLICATIONS

Filtration Group; The Aerostar Titan FP Series; https://www.filtrationgroup.com/product/41258; Originally accessed Dec. 27, 2017; 5 Pages.
(Continued)

*Primary Examiner* — Minh Chau T Pham
(74) *Attorney, Agent, or Firm* — Brad C. Spencer (57) ABSTRACT

A filter bank includes a filter enclosure. A first filter panel and a second filter panel are flexibly joined along respective proximal ends of the first filter panel and the second filter panel by a living hinge. A first sealing gasket extends along a distal end of the first filter panel and forms a first air seal within the filter enclosure. A second sealing gasket extends along a distal end of the second filter panel and forms a second air seal within the filter enclosure. A third sealing gasket extends along the living hinge. A pivoting sealing rail pivots within the filter enclosure to form a third air seal against said third sealing gasket extending along the living hinge.

17 Claims, 5 Drawing Sheets

(52) U.S. Cl.
CPC .... *B01D 2265/025* (2013.01); *B01D 2267/00* (2013.01); *B01D 2271/02* (2013.01); *B01D 2271/022* (2013.01)

(58) Field of Classification Search
CPC ............ B01D 46/0023; B01D 2267/00; B01D 2265/02; B01D 2271/02
USPC ......... 55/483, 484, 490, 495, 497, 498, 502, 55/511, 521, DIG. 31
See application file for complete search history.

(56) References Cited

U.S. PATENT DOCUMENTS

| | | | | |
|---|---|---|---|---|
| 4,193,780 | A | * | 3/1980 | Cotton, Jr. ............ B01D 46/06 55/378 |
| 4,225,328 | A | * | 9/1980 | Stiehl .................... B01D 46/02 55/378 |
| 4,925,468 | A | | 5/1990 | Kishi et al. |
| 5,188,646 | A | * | 2/1993 | Nolen, Jr. ........... B01D 46/0002 55/486 |
| 5,512,074 | A | * | 4/1996 | Hanni ................ B01D 46/0005 55/484 |
| 6,214,076 | B1 | | 4/2001 | Beier et al. |
| 6,447,566 | B1 | | 9/2002 | Rivera et al. |
| 6,485,538 | B1 | * | 11/2002 | Toyoshima ........ B01D 46/0005 55/482 |
| 6,955,696 | B1 | * | 10/2005 | Ost .................... B01D 46/0005 210/470 |
| 8,328,895 | B2 | * | 12/2012 | Nicholas ............ B01D 46/0005 55/483 |
| 8,404,023 | B1 | | 3/2013 | Osborne et al. |
| 8,523,972 | B2 | * | 9/2013 | Borkent ............. B01D 46/0023 55/484 |
| 8,747,505 | B2 | * | 6/2014 | Crabtree ............ B01D 46/0005 55/490 |
| 8,814,994 | B2 | | 8/2014 | Wiser et al. |
| 2007/0144125 | A1 | | 6/2007 | Duffy |
| 2011/0233133 | A1 | | 9/2011 | Wacker et al. |
| 2012/0055127 | A1 | * | 3/2012 | Holzmann ......... B01D 46/0001 55/484 |
| 2012/0311978 | A1 | | 12/2012 | Crabtree et al. |
| 2014/0237966 | A1 | | 8/2014 | Chin et al. |
| 2014/0238240 | A1 | | 8/2014 | Raether |
| 2016/0214053 | A1 | | 7/2016 | Schwartz |

FOREIGN PATENT DOCUMENTS

| | | |
|---|---|---|
| DE | 10 2007 016161 A1 | 10/2008 |
| EP | 0 479 114 A1 | 4/1992 |
| EP | 2 764 902 B1 | 8/2014 |
| WO | 00/74818 A1 | 12/2000 |

OTHER PUBLICATIONS

Koch Filter; http://www.globalindustrial.com/p/hvac/filters/air-filters-koch/koch-filter-95-duramax-4v-extended-surface-w-plastic-frame-24-inch-w-x-24-inch-h-x-12-inch-d; Originally accessed Dec. 27, 2017; 2 Pages.

"Mini dust collector 2 (a different approach to dust collection)"; https://woodgears.ca/dust_collector/mini_2.html; Originally accessed Dec. 27, 2017; 10 Pages.

Partial European Search Report for Corresponding Application No. EP18162578.1; dated Aug. 13, 2018; pp. 1-11.

Extended European Search Report from Corresponding Application No. EP18162578.1; dated Nov. 22, 2018; pp. 1-13.

* cited by examiner

FIG. 6

FUME FILTER BANK WITH PANEL FILTER

CROSS-REFERENCE TO RELATED APPLICATIONS

Benefit of U.S. Provisional Patent Application Ser. No. 62/472,914 filed on Mar. 17, 2017, is hereby claimed and the disclosure incorporated herein by reference.

BACKGROUND OF THE INVENTION

Field of the Invention

Embodiments of the present invention relate to filter banks for dust and fume extraction systems, and air filter cartridges for use in filter banks.

Description of Related Art

Filter banks are used to collect dust and fumes within a fume extraction system. Certain industrial processes, such as welding, hardfacing, or plasma cutting can generate fumes and dust. Fume extraction systems are employed to remove the fumes and dust entrained in the air around a work area. A fume extraction system can include individual suction inlets, commonly located on movable "arms" (e.g., repositionable branch ducts), that are tied to a common extraction duct. The extraction duct is connected to a filter bank (also referred to as a dust collector). Prior to discharging the removed air to another space or outdoors, the air passes through the filter bank and is cleaned. The filter bank is an enclosure containing air filters for cleaning the air of certain solid contaminants entrained in the air. Contaminated air enters the filter compartment and passes through the filters. The cleaned air can be ducted to an appropriate discharge location.

Figure 1:
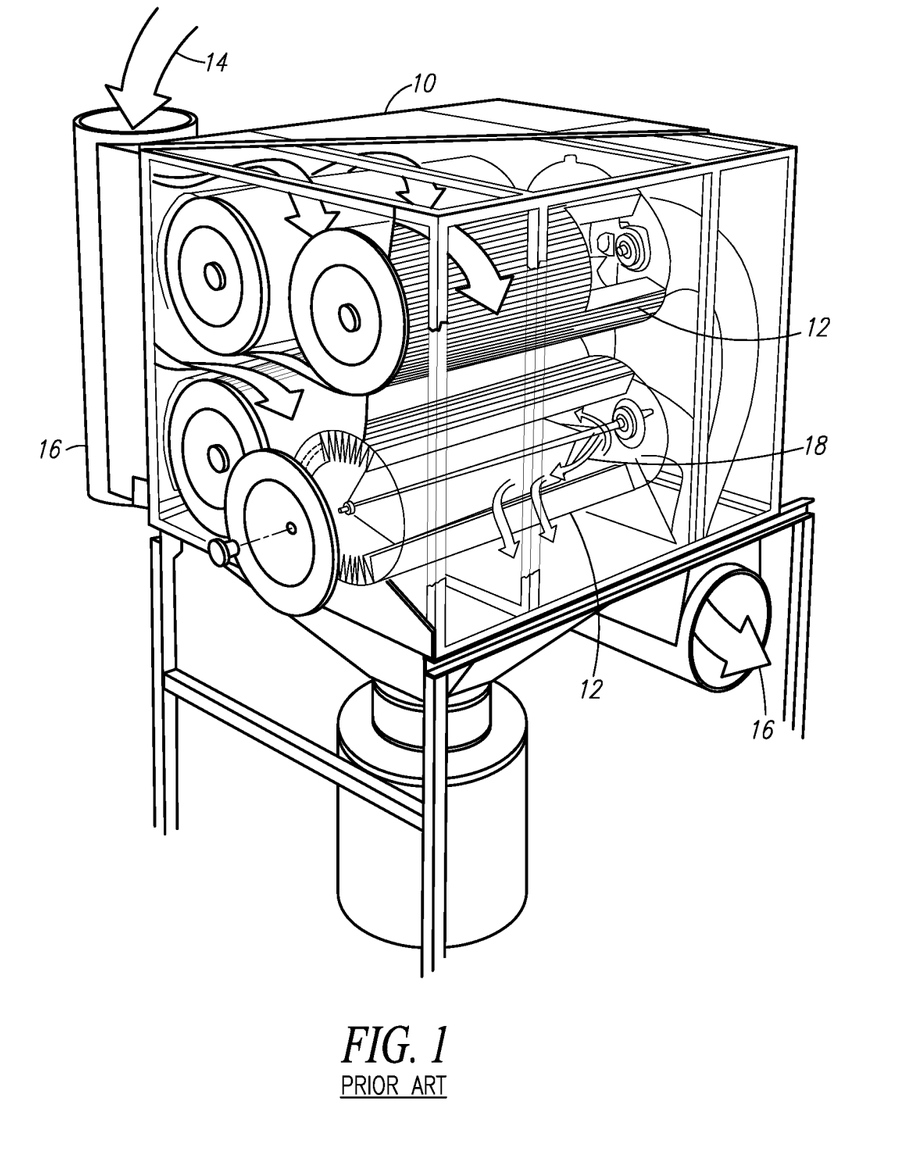
FIG. 1 is a perspective view of a filter bank.

A conventional fume extraction filter bank is shown in FIG. 1. The filter bank has an outer enclosure 10 that forms a plenum for a contaminated airflow. The filters 12 within the enclosure 10 are cylindrical and are mounted horizontally or vertically within the enclosure. Contaminated air 14 is drawn or pushed through a pre-filter 16 and into the enclosure 10. Air flows through the cylindrical filters 12 and into the interior of the filters. Cleaned air 16 then flows from the interior of the cylindrical filters 12 and out of an open end of the cylinder, and ultimately out of the enclosure 10. The filter bank can include filter cleaning controls to monitor a pressure differential across the filters 12, to determine when the filters themselves need to be cleaned or replaced. Pulsed air 18 can be directed into the interior central opening of the filters 12 to clean them. The pulsed air 14 "backwashes" the filter cartridge 12, releasing dust collected on the surface of the filters. The dust can be collected at the bottom of the filter bank via a hopper and catch bin arrangement.

BRIEF SUMMARY OF THE INVENTION

The following summary presents a simplified summary in order to provide a basic understanding of some aspects of the devices, systems and/or methods discussed herein. This summary is not an extensive overview of the devices, systems and/or methods discussed herein. It is not intended to identify critical elements or to delineate the scope of such devices, systems and/or methods. Its sole purpose is to present some concepts in a simplified form as a prelude to the more detailed description that is presented later.

In accordance with one aspect of the present invention, provided is a filter bank. The filter bank includes a filter enclosure. A first filter panel and a second filter panel are flexibly joined along respective proximal ends of the first filter panel and the second filter panel by a living hinge. A first sealing gasket extends along a distal end of the first filter panel and forms a first air seal within the filter enclosure. A second sealing gasket extends along a distal end of the second filter panel and forms a second air seal within the filter enclosure. A third sealing gasket extends along the living hinge. A pivoting sealing rail pivots within the filter enclosure to form a third air seal against said third sealing gasket extending along the living hinge.

The filter bank can further comprise a zigzag filter arrangement including the first filter panel, the second filter, a third filter panel, and a fourth filter panel, wherein the third filter panel and the fourth filter panel are joined by a second living hinge. The pivoting sealing rail can automatically pivot upward into a sealing position against said third sealing gasket due to insertion of the first filter panel and the second filter panel into the filter enclosure. Further, the pivoting sealing rail can be configured to raise the first filter panel to form the first air seal and raise the second filter panel to form the second air seal when pivoted upward into the sealing position. In other embodiments, the pivoting sealing rail is manually pivoted upward into a sealing position against said third sealing gasket, and the pivoting sealing rail is configured to raise the first filter panel to form the first air seal and raise the second filter panel to form the second air seal when pivoted upward into the sealing position. In certain embodiments, the filter bank further comprises a first sealing channel within the filter enclosure, and a second sealing channel within the filter enclosure, wherein the distal end of the first filter panel includes a first mounting flange vertically captured within the first sealing channel, and the distal end of the second filter panel includes a second mounting flange vertically captured within the second sealing channel. Further, the first mounting flange and the second mounting flange can be T-shaped, and the first sealing channel and the second sealing channel can be formed from C-channel.

In accordance with another aspect of the present invention, provided is a filter bank. The filter bank includes a filter enclosure. A first sealing channel is located within the filter enclosure. A second sealing channel is located within the filter enclosure. A first filter panel and a second filter panel are flexibly joined by a living hinge located between a proximal end of the first filter panel and a proximal end of the second filter panel. The first filter panel includes a first distal flanged end located within the first sealing channel, and the second filter panel includes a second distal flanged end located within the second sealing channel. A first sealing gasket extends along the first distal flanged end of the first filter panel and forms a first air seal within the first sealing channel. A second sealing gasket extends along the second distal flanged end of the second filter panel and forms a second air seal within the second sealing channel. A third sealing gasket extends along the living hinge and forms a third air seal within the filter enclosure.

The filter bank can further comprise a zigzag filter arrangement including the first filter panel, the second filter, a third filter panel, and a fourth filter panel, wherein the third filter panel and the fourth filter panel are joined by a second living hinge. The first distal flanged end of the first filter panel can be vertically captured within the first sealing channel, and the second distal flanged end of the second filter panel can be vertically captured within the second sealing channel. Further, the first distal flanged end of the first filter panel and the second distal flanged end of the second filter panel can be T-shaped, and the first sealing channel and the second sealing channel can be formed from C-channel. In certain embodiments, the filter bank further comprises a pivoting sealing rail, located beneath the living hinge, that pivots upward to form the third air seal against said third sealing gasket extending along the living hinge. Further, the pivoting sealing rail can automatically pivot upward into a sealing position against said third sealing gasket as the first distal flanged end of the first filter panel is inserted into the first sealing channel and the second distal flanged end of the second filter panel is inserted into the second sealing channel. Further still, the pivoting sealing rail can be configured to raise the first filter panel to form the first air seal and raise the second filter panel to form the second air seal when pivoted upward into the sealing position. In certain embodiments, the pivoting sealing rail can be manually pivoted upward into a sealing position against said third sealing gasket.

In accordance with another aspect of the present invention, provided is a filter bank. The filter bank includes a filter enclosure. A first sealing channel, a second sealing channel, a third sealing channel, and a fourth sealing channel are located within the filter enclosure. A first filter panel and a second filter panel are flexibly joined by a first living hinge located between a proximal end of the first filter panel and a proximal end of the second filter panel, wherein the first filter panel includes a first distal flanged end located within the first sealing channel, and the second filter panel includes a second distal flanged end located within the second sealing channel. A third filter panel and a fourth filter panel are flexibly joined by a second living hinge located between a proximal end of the third filter panel and a proximal end of the fourth filter panel, wherein the third filter panel includes a third distal flanged end located within the third sealing channel, and the fourth filter panel includes a fourth distal flanged end located within the fourth sealing channel. The first filter panel, the second filter panel, the third filter panel, and the fourth filter panel are arranged in a zigzag configuration and are respectively vertically captured by the first sealing channel, the second sealing channel, the third sealing channel, and the fourth sealing channel. A first sealing rail is movable within the filter enclosure between an unsealed position and a sealing position to form a first air seal against said the first living hinge. A second sealing rail is movable within the filter enclosure between an unsealed position to a sealing position to form a second air seal against the second living hinge.

The first sealing rail can be configured to lift the first filter panel and the second filter panel to form respective air seals with the first sealing channel and the second sealing channel, and the second sealing rail can be configured to lift the third filter panel and the fourth filter panel to form respective air seals with the third sealing channel and the fourth sealing channel. The first sealing rail can automatically pivot upward into the sealing position against the first living hinge due to insertion of the first filter panel and the second filter panel into the filter enclosure, and the second sealing rail can automatically pivot upward into a sealing position against the second living hinge due to insertion of the third filter panel and the fourth filter panel into the filter enclosure. In certain embodiments, the first distal flanged end, the second distal flanged end, the third distal flanged end, and the fourth distal flanged end are T-shaped, and the first sealing channel, the second sealing channel, the third sealing channel, and the fourth sealing channel are formed from C-channel.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

The present invention relates to filter banks or dust collectors for fume extraction systems. The present invention will now be described with reference to the drawings, wherein like reference numerals are used to refer to like elements throughout. It is to be appreciated that the various drawings are not necessarily drawn to scale from one figure to another nor inside a given figure, and in particular that the size of the components are arbitrarily drawn for facilitating the understanding of the drawings. In the following description, for purposes of explanation, numerous specific details are set forth in order to provide a thorough understanding of the present invention. It may be evident, however, that the present invention can be practiced without these specific details. Additionally, other embodiments of the invention are possible and the invention is capable of being practiced and carried out in ways other than as described. The terminology and phraseology used in describing the invention is employed for the purpose of promoting an understanding of the invention and should not be taken as limiting.

The filter bank discussed below employs generally flat filter panels rather than the cylindrical filter cartridges 12 shown in FIG. 1. Cylindrical filters can provide a high pressure drop across them during filtering, as compared to filter panels. A high pressure drop increases the power needed move air through the filters and reduces the efficiency of the fume extractor. Cylindrical filters also have a large volume and can be expensive to ship and require additional packaging material, as compared to filter panels. Filter panels can be shipped flat, whereas a cylindrical filter will include a large central void. A cylindrical filter filters air around its circumference. As can be seen in FIG. 1, the cylindrical filters 12 have upwardly-facing portions (e.g., between 11:00 and 1:00 positions around the circumference) that will collect dust. However, gravity does not assist in clearing such portions during pulsed air cleaning, which can result in dust falling back onto upwardly-facing portions of the cylindrical filter. The panel filters discussed below filter air through their downwardly-facing surfaces and, thus, gravity helps the filtered dust to fall away from the filters. Accordingly, panel filters can be less expensive to ship, more efficient to operate, and easier to clean than comparable cylindrical filters.

Figure 2:
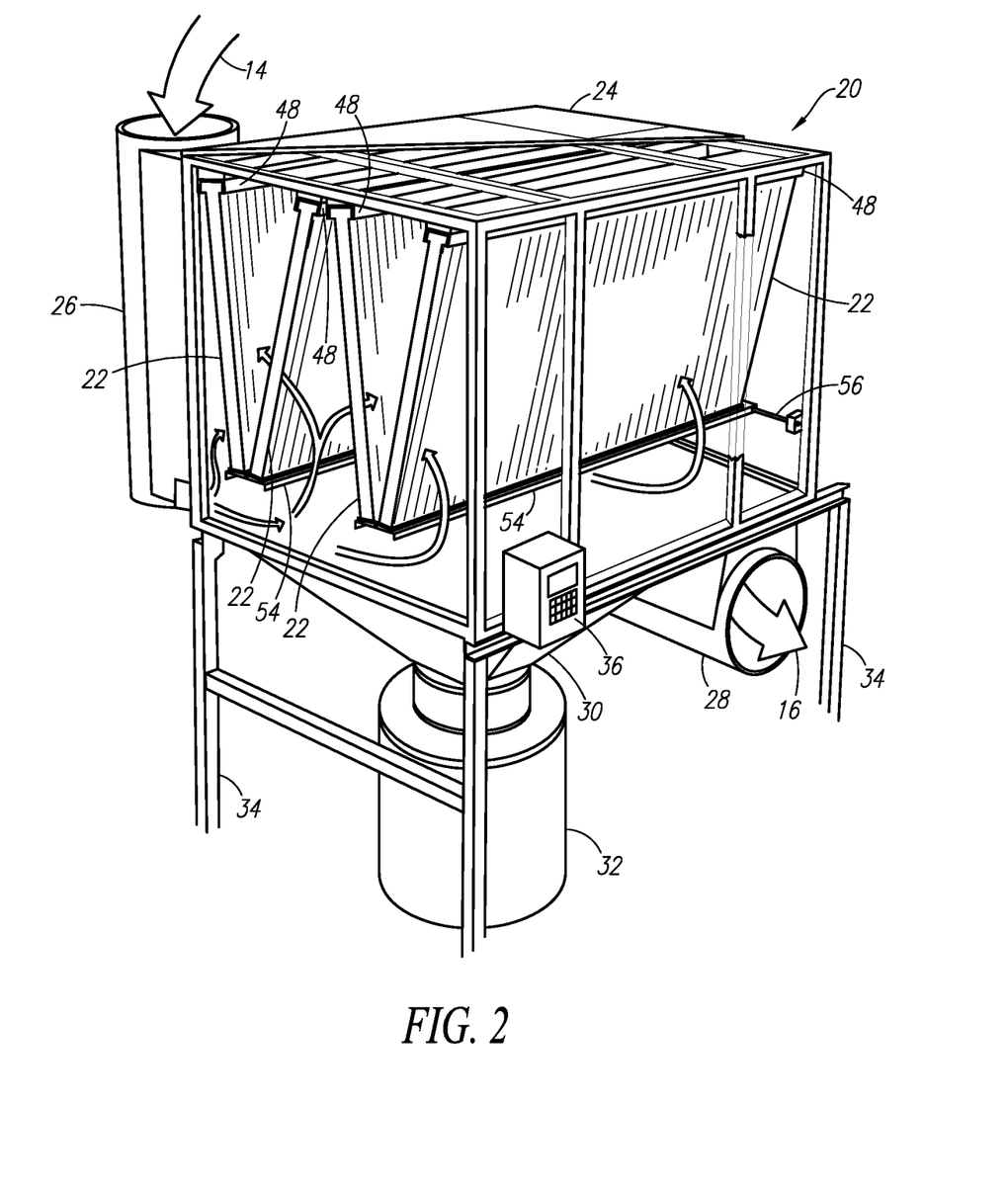
FIG. 2 is a perspective view of a filter bank.

An example filter bank 20 employing panel filters 22 is shown in FIG. 2. The filter bank 20 has an outer filter enclosure 24. The panel filters 22 are sealed within the filter enclosure 24, such as by elastomeric gaskets on the filters, to divide the enclosure into contaminated and clean air handling portions. The filter bank 20 can include a pre-filter 26 in fluid communication with the contaminated air portions of the filter enclosure 24. Contaminated air 14, generated at a workstation such as a welding or plasma cutting station, is drawn or pushed through the pre-filter 26 and into the filter enclosure 24 by a blower or fan. The pre-filter 26 can include an air intake that is connected to ductwork for conveying contaminated air to the filter bank 20. The filter bank 20 includes an air outlet 28 that may be attached to additional clean air ductwork for ventilating cleaned air 16 to a desired location. A blower or fan of the fume extraction system can be part of the filter bank 20 or located remotely from the filter bank.

The filter enclosure 24 can include a door (not shown) that provides access to the filters 22. The door, or enclosure 24, can include a gasket to seal the door against the enclosure when the door is closed. The enclosure 24 forms a lower hopper 30. Dust and other contaminants are removed from the contaminated air by the panel filters 22 within the enclosure 24. The dust can fall into the hopper 30 and be discharged to a receptacle 32. The filter bank 20 can include legs 34 to raise the enclosure 24 above the ground, so that the receptacle 32 can be placed beneath the hopper 14.

The filter bank 20 can include a local or remote control panel 36 having a user interface for controlling the operations of the filter bank and/or the fume extraction system. The control panel 36 can include indicators to inform a user that a filter requires cleaning or replacement (e.g., based on an increased pressure drop across a filter). The control panel 36 can also include controls for activating a filter cleaning system. The filter bank 20 can utilize blasts of compressed air to "backwash" the filters 22 and dislodge dust from the filter media. In certain embodiments, the filter bank 20 can include a compressed air tank for storing compressed air that is provided by an air compressor that is a part of the filter bank or located remote from the filter bank. Valves, such as solenoid valves for example, control the discharge of compressed air from the air tank to the filters in a series of pulses during a cleaning cycle. The filter enclosure 24 can include respective air nozzles aligned with the filters 22 to direct the air pulses in a reverse direction through the filters.

Figure 3:
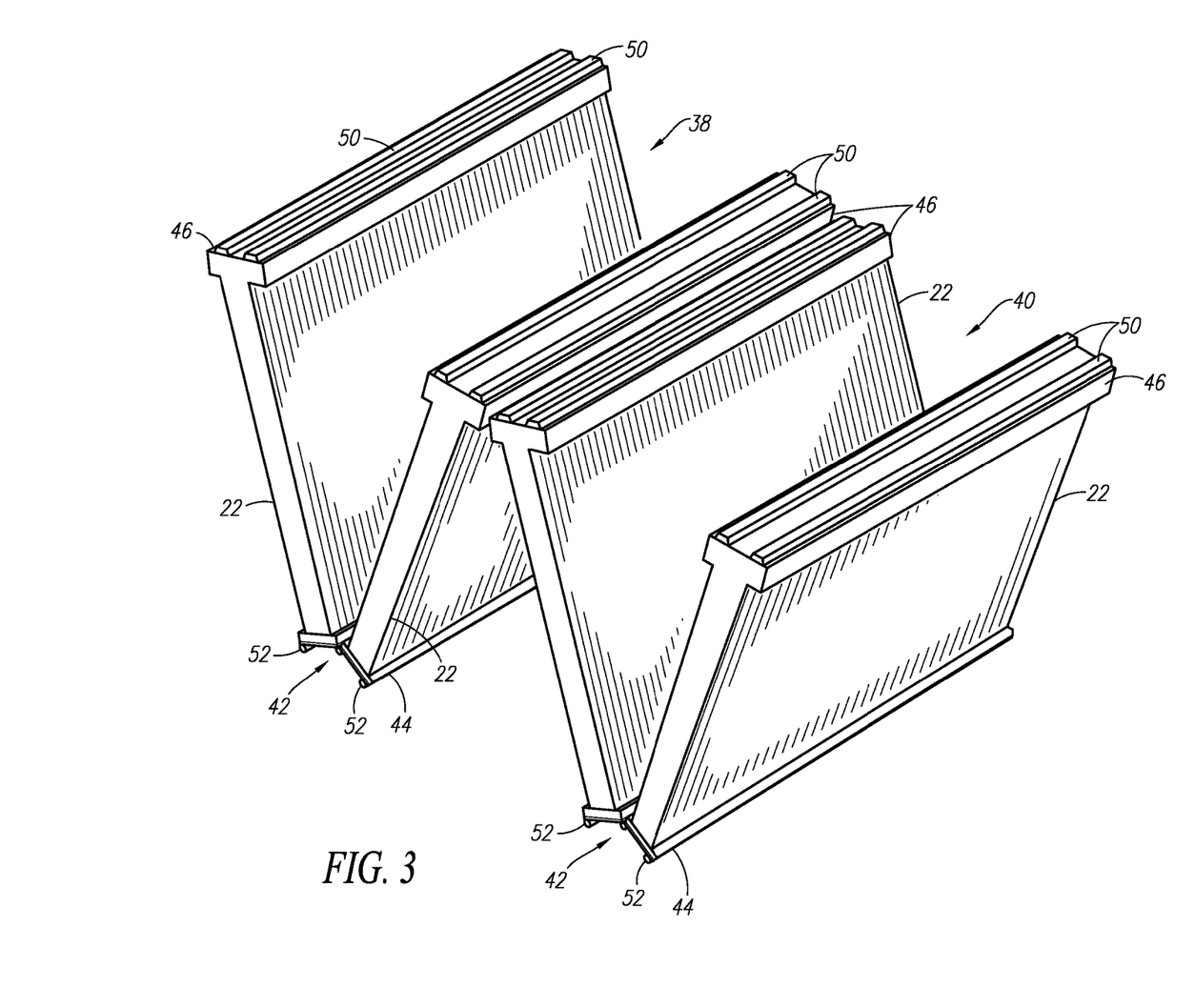
FIG. 3 is a perspective view of filters.
Figure 4:
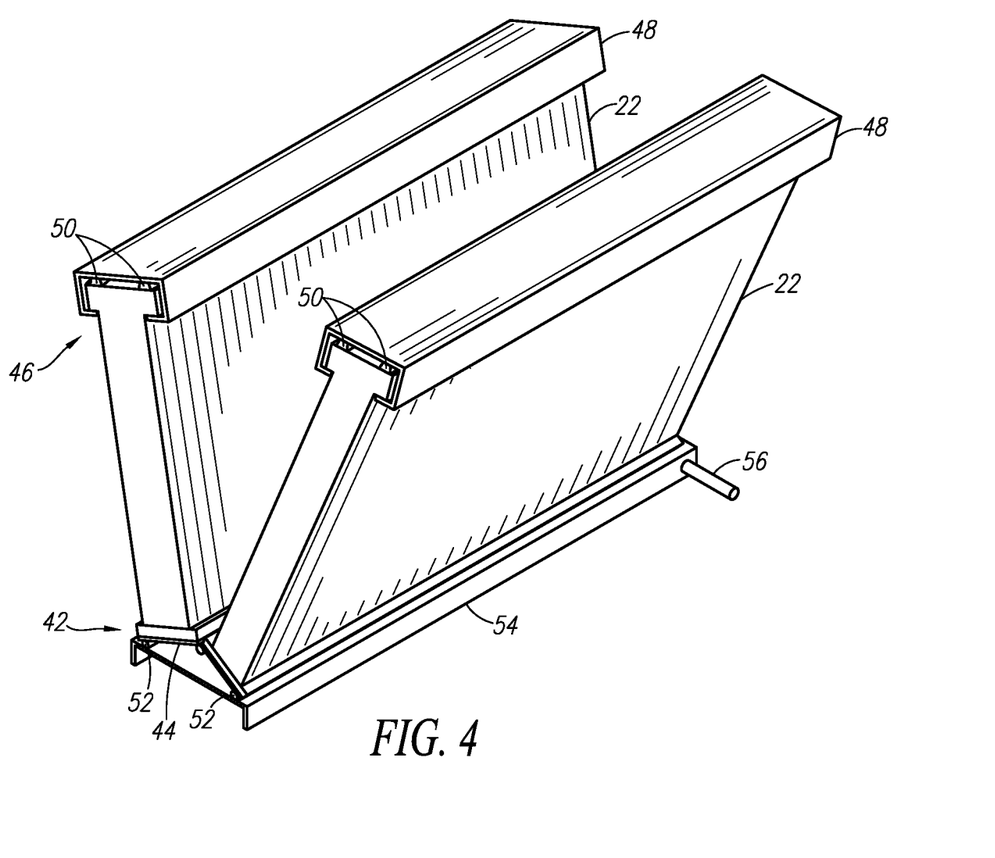
FIG. 4 shows a perspective view of a filter sealing arrangement.
Figure 5:
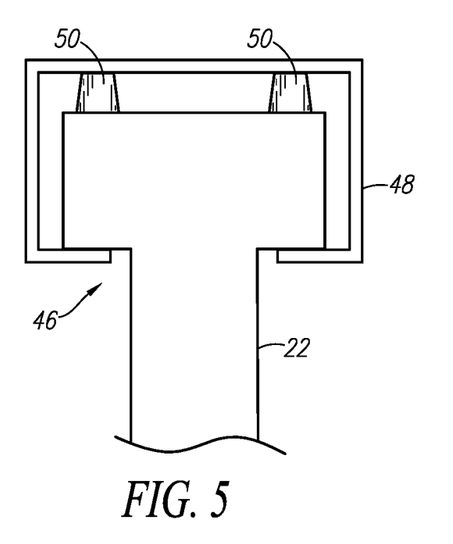
FIG. 5 shows a portion of a filter and a sealing channel for the filter.
Figure 6:
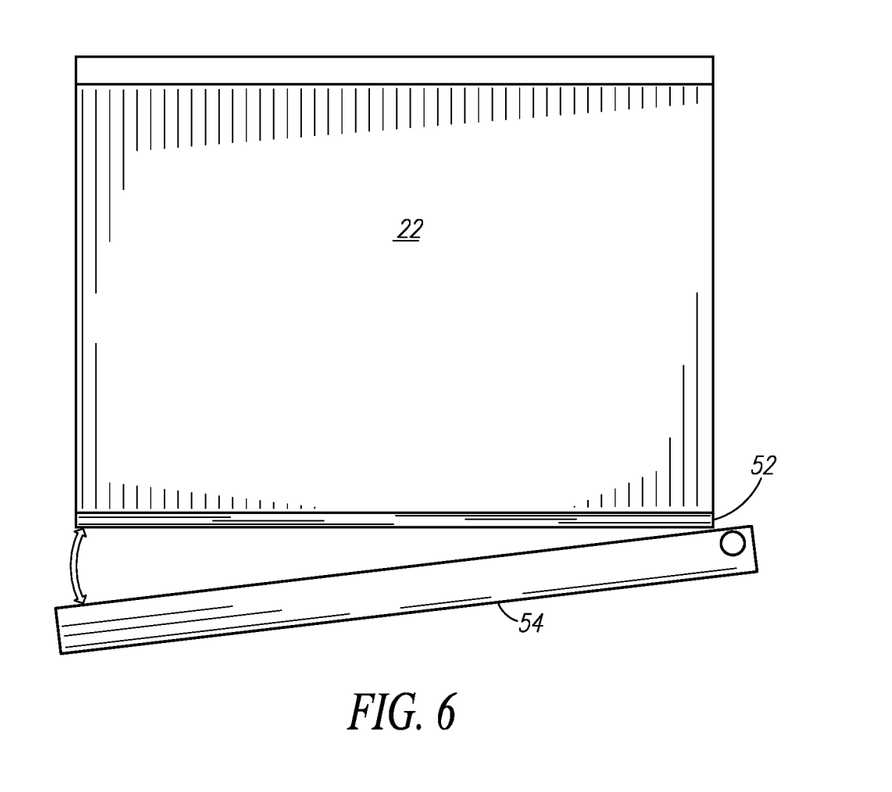
FIG. 6 shows a side view of a filter and bottom sealing rail for the filter.

As can be seen in FIG. 2, the panel filters 22 form a zigzag filter arrangement within the filter enclosure 24. An individual filter cartridge is formed from a number of generally flat filter panels (e.g., 2, 4, more than 4 panels, etc.) FIG. 3 shows two filter cartridges 38, 40 each formed from two panel filters 22, which are joined together along respective proximal ends 42 of the panels. The panels 22 of the filter cartridges 38, 40 can be square or rectangular, or other generally planar shapes if desired. The panels 22 of the filter cartridges 38, 40 can be hinged together, such as via a living hinge 44 formed by the filter material or some other flexible material (e.g., a paper strip, an elastomeric strip, foam gasket, etc.) located along adjacent edges of the panels. In FIG. 3, the living hinge 44 flexibly joins the individual filter panels 22 of each filter cartridge 38, 40 along the proximal ends 42 of the filter panels. When expanded or unfolded, the individual filter cartridges 38, 40 forming the zigzag pattern can have V-shapes, W-shapes, or other shapes as will be appreciated by one of ordinary skill in the art.

Individual filter cartridges 38, 40 can be shipped and stored in a flat state. If the filter cartridges 38, 40 have hinged panels 22, the filter cartridges can be shipped and stored in a folded flat state in which the panel sections of the filter cartridge are adjacent one another. It is to be appreciated that the filter cartridges 38, 40 shown in FIG. 3 will have a smaller volume when their panels 22 are folded together, as compared to an equivalent cylindrical filter. The filter cartridges 38, 40 can be kept in the folded state until installed in a filter bank, at which time they are unfolded along one or more hinges and expanded to increase the exposed surface area.

The generally flat panels 22 of the filter cartridges 38, 40 can have a lower pressure drop across them during filtering, as compared to an equivalent cylindrical filter. This is due to the greater open outlet area provided by the prism shapes of a zigzag filter configuration as compared to an equivalent cylindrical filter's open/exit area at one end of the cylinder. Thus, the filter cartridges discussed herein may be more efficient to operate than comparable cylindrical filters, and possibly shipped at less expense and stored more conveniently than comparable cylindrical filters. Moreover, pulsed air filter cleaning can be simplified using a zigzag configuration of filter panels. For example, with filter panels placed in a V or W shape, gravity helps filter contaminants to fall away from the filter media.

The filter media used in the filter cartridges 38, 40 can be any appropriate media for the intended application, such as cellulose, polyester, glass media, etc. The media can be pleated if desired to increase surface area.

The panels should be sealed within the filter bank enclosure, so that the contaminated airflow must pass through the filter media. Example sealing gaskets for sealing the filter panels 22 are shown in FIGS. 3-6. In certain embodiments, the distal ends 46 of the panels 22 can be flanged (e.g., T-shaped) to form distal flanged ends that are received in sealing channels 48 within the filter enclosure. Extending along the distal ends 46 of the panels 22 are one or more elastomeric sealing gaskets 50 for forming air seals within the filter enclosure. The panels 22 shown in the drawings include two sealing gaskets 50 on each distal flanged end 46. However, the distal ends 46 can include a single sealing gasket or more than two gaskets if desired. The gaskets 50 are shown as being located on the top surface of the distal flanged ends 46 of the panels 22. However, the gaskets could be located on other surfaces of the distal end, such as along the side or bottom surfaces of the flanged end.

The proximal ends 42 of the filter panels 22 can also include one or more sealing gaskets 52 extending along the living hinge 44, for forming air seals within the filter enclosure. In certain embodiments, the living hinges 44 can have projections, such as one or more flexible flaps or wipers, that seal against the interior of the enclosure to provide the sealing gaskets. Opening or unfolding the filter panels can relax or unstretch the living hinge 44, which can aid is sealing the hinge within the filter enclosure.

As noted above, the filter bank enclosure can include sealing channels 48. The sealing channels 48 receive the distal flanged ends 46 of the filter panels 22, and the sealing gaskets 50 seal against an interior surface of the channels. The sealing channels 48 can be formed from U or C-channel, for example, or have another appropriate shape. The sealing channels 48 can vertically capture the mounting flange of the distal ends 46 of the filter panels 22, so that the filter panels can be hung from the channels. When installed, the filter panels 22 are slid into the sealing channels 48 (e.g., in a forward to rearward direction) and hang downward on their T-shaped flanges. The flanges on the distal ends 46 of the filter panels 22 could have various shapes suitable for being vertically captured within the sealing channels 48, such as L-shaped or arrow shaped for example.

In certain embodiments, the living hinge 44 can seal directly against a lower surface of the filter enclosure. The filter enclosure could include a channel or other positioning structure, similar to the sealing channels discussed above, for properly positioning the proximal ends 42 of the filter panels 22 and creating an air seal against the sealing gaskets 52 that extend along the living hinge 44. In the embodiments shown in the figures, the filter bank includes a sealing rail, such as a pivoting sealing rail 54, that is located beneath the living hinge 44 and that pivots within the filter enclosure to form the air seal against the sealing gaskets 52 that extend along the living hinge 44. The pivoting sealing rail 54 can allow the filter panels 22 to be pushed into the filter enclosure "loosely", without the seals compressed during insertion (which could possibly damage the seals). The pivoting sealing rail 54 pivots upward into a sealing position to seal against the sealing gaskets 52 that extend along the living hinge 44. The pivoting sealing rail 54 exerts an upward force on the filter cartridges. In certain embodiments, the pivoting sealing rail 54 also lifts the filter panels 22 so that their upper sealing gaskets 50 at the distal ends of the panels seal against the sealing channels 48. The pivoting sealing rail 54 can pivot about a pivot member 56 as a result of the filter cartridge contacting the pivoting sealing rail, so as to automatically pivot upward into the sealing position against the sealing gaskets 52. This will result in an automatic sealing of the filter within the filter enclosure due to insertion of the filter panels 22 into the filter enclosure. As the filter is inserted, it will contact a rear portion of the pivoting sealing rail 54, causing it to pivot upward into the sealing position. Thus, as the distal flanged ends 46 of the filter panels 22 are inserted into the sealing channels 48, the pivoting sealing rail 54 can automatically pivot upwards into the sealing position against the sealing gaskets 52 along the living hinge 44. Alternatively, the pivoting sealing rail 54 can be moved manually upward into the sealing position, such as via a manually-operated lever, to seal the filter within the filter enclosure. The filter enclosure can include stops that limit the upward and downward rotation, or angle of travel, of the pivoting sealing rail 54. The filter enclosure can also include a lock, such as a manually releasable locking tab, to hold the pivoting sealing rail 54 in the sealing position. In certain embodiments, the sealing rail does not pivot about a pivot member 56, but translates upward and downward between the sealing position and an unsealed position. The filter enclosure can include a lifting mechanism, such as a lever or scissors-type lifting mechanism, to raise and lower the sealing rail. The upward and downward translation of the sealing rail could also include a forward-to-rearward or rearward-to-forward movement of the sealing rail, such as when moved by a pivoting lever for example.

The filter panels 22 are shown in the figures as being mounted within the filter enclosure 24 in a V shape, with the living hinge 44 located downward from the distal flanged ends 46. However, the filter panels 22 could be mounted in other configurations, such as an inverted V in which the living hinge 44 is located higher within the filter enclosure 24 than the distal flanged ends 46 of the filter panels 22. The filter panels 22 can include additional sealing gaskets if desired, such as along the front and rear faces of the panels, to seal against the filter enclosure door and rear wall for example.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A filter bank, comprising:
   a filter enclosure;
   a first filter panel and a second filter panel flexibly joined along respective proximal ends of the first filter panel and the second filter panel by a living hinge, wherein flexing of the living hinge permits unfolding of the first filter panel and the second filter panel from a folded state in which a distal end of the first filter panel is adjacent a distal end of the second filter panel to a V-shaped state in which the distal end of the first filter panel is separated from the distal end of the second filter panel;
   a first sealing gasket extending along the distal end of the first filter panel and forming a first air seal within the filter enclosure;
   a second sealing gasket extending along the distal end of the second filter panel and forming a second air seal within the filter enclosure;
   a first sealing channel within the filter enclosure;
   a second sealing channel within the filter enclosure, wherein the distal end of the first filter panel is T-shaped and is vertically captured within the first sealing channel, and the distal end of the second filter panel is T-shaped and is vertically captured within the second sealing channel; and
   a pivoting sealing rail that pivots within the filter enclosure to form a third air seal along the living hinge.

2. The filter bank of claim 1, further comprising a zigzag filter arrangement including the first filter panel, the second filter, a third filter panel, and a fourth filter panel, wherein the third filter panel and the fourth filter panel are joined by a second living hinge.

3. The filter bank of claim 1, further comprising a third sealing gasket extending along the living hinge, wherein the pivoting sealing rail automatically pivots upward into a sealing position against said third sealing gasket due to insertion of the first filter panel and the second filter panel into the filter enclosure.

4. The filter bank of claim 3, wherein the pivoting sealing rail is configured to raise the first filter panel to form the first air seal and raise the second filter panel to form the second air seal when pivoted upward into the sealing position.

5. The filter bank of claim 1, wherein the pivoting sealing rail is manually pivoted upward into a sealing position against a third sealing gasket extending along the living hinge, and wherein the pivoting sealing rail is configured to raise the first filter panel to form the first air seal and raise the second filter panel to form the second air seal when pivoted upward into the sealing position.

6. The filter bank of claim 1, wherein the first sealing channel and the second sealing channel are formed from C-channel.

7. A filter bank, comprising:
   a filter enclosure;
   a first sealing channel within the filter enclosure;
   a second sealing channel within the filter enclosure;
   a first filter panel and a second filter panel flexibly joined by a living hinge located between a proximal end of the first filter panel and a proximal end of the second filter panel, wherein the first filter panel includes a first T-shaped distal flanged end located within the first sealing channel, and the second filter panel includes a second T-shaped distal flanged end located within the second sealing channel, and wherein flexing of the living hinge permits unfolding of the first filter panel and the second filter panel from a folded state in which the first T-shaped distal flanged end of the first filter panel is adjacent the second T-shaped distal flanged end of the second filter panel to a V-shaped state in which the first T-shaped distal flanged end of the first filter panel is separated from the second T-shaped distal flanged end of the second filter panel;

a first sealing gasket extending along the first T-shaped distal flanged end of the first filter panel and forming a first air seal within the first sealing channel;

a second sealing gasket extending along the second T-shaped distal flanged end of the second filter panel and forming a second air seal within the second sealing channel; and a third sealing gasket extending along the living hinge and forming a third air seal within the filter enclosure, wherein the first T-shaped distal flanged end of the first filter panel is vertically captured within the first sealing channel, and the second T-shaped distal flanged end of the second filter panel is vertically captured within the second sealing channel.

8. The filter bank of claim 7, further comprising a zigzag filter arrangement including the first filter panel, the second filter, a third filter panel, and a fourth filter panel, wherein the third filter panel and the fourth filter panel are joined by a second living hinge.

9. The filter bank of claim 7, wherein the first sealing channel and the second sealing channel are formed from C-channel.

10. The filter bank of claim 7, further comprising a pivoting sealing rail, located beneath the living hinge, that pivots upward to form the third air seal against said third sealing gasket extending along the living hinge.

11. The filter bank of claim 10, wherein the pivoting sealing rail automatically pivots upward into a sealing position against said third sealing gasket as the first T-shaped distal flanged end of the first filter panel is inserted into the first sealing channel and the second T-shaped distal flanged end of the second filter panel is inserted into the second sealing channel.

12. The filter bank of claim 11, wherein the pivoting sealing rail is configured to raise the first filter panel to form the first air seal and raise the second filter panel to form the second air seal when pivoted upward into the sealing position.

13. The filter bank of claim 10, wherein the pivoting sealing rail is manually pivoted upward into a sealing position against said third sealing gasket, and wherein the pivoting sealing rail is configured to raise the first filter panel to form the first air seal and raise the second filter panel to form the second air seal when pivoted upward into the sealing position.

14. A filter bank, comprising:
a filter enclosure;
a first sealing channel within the filter enclosure;
a second sealing channel within the filter enclosure;
a third sealing channel within the filter enclosure;
a fourth sealing channel within the filter enclosure;
a first filter panel and a second filter panel flexibly joined by a first living hinge located between a proximal end of the first filter panel and a proximal end of the second filter panel, wherein the first filter panel includes a first T-shaped distal flanged end located within the first sealing channel, and the second filter panel includes a second T-shaped distal flanged end located within the second sealing channel, and wherein flexing of the first living hinge permits unfolding of the first filter panel and the second filter panel from a folded state in which the first T-shaped distal flanged end is adjacent the second T-shaped distal flanged end to a V-shaped state in which the first T-shaped distal flanged end is separated from the second T-shaped distal flanged end;

a third filter panel and a fourth filter panel flexibly joined by a second living hinge located between a proximal end of the third filter panel and a proximal end of the fourth filter panel, wherein the third filter panel includes a third T-shaped distal flanged end located within the third sealing channel, and the fourth filter panel includes a fourth T-shaped distal flanged end located within the fourth sealing channel, wherein flexing of the second living hinge permits unfolding of the third filter panel and the fourth filter panel from a folded state in which the third T-shaped distal flanged end is adjacent the fourth T-shaped distal flanged end to a V-shaped state in which the third T-shaped distal flanged end is separated from the fourth T-shaped distal flanged end, and wherein the first filter panel, the second filter panel, the third filter panel, and the fourth filter panel are arranged in a zigzag configuration and are respectively vertically captured by the first sealing channel, the second sealing channel, the third sealing channel, and the fourth sealing channel;

a first sealing rail that is movable within the filter enclosure between an unsealed position and a sealing position to form a first air seal against the first living hinge; and a second sealing rail that is movable within the filter enclosure between an unsealed position and a sealing position to form a second air seal against the second living hinge.

15. The filter bank of claim 14, wherein the first sealing rail is configured to lift the first filter panel and the second filter panel to form respective air seals with the first sealing channel and the second sealing channel, and
wherein the second sealing rail is configured to lift the third filter panel and the fourth filter panel to form respective air seals with the third sealing channel and the fourth sealing channel.

16. The filter bank of claim 14, wherein the first sealing rail automatically pivots upward into the sealing position with the first living hinge due to insertion of the first filter panel and the second filter panel into the filter enclosure, and
the second sealing rail automatically pivots upward into the sealing position with the second living hinge due to insertion of the third filter panel and the fourth filter panel into the filter enclosure.

17. The filter bank of claim 14, wherein the first sealing channel, the second sealing channel, the third sealing channel, and the fourth sealing channel are formed from C-channel.

* * * * *